(12) United States Patent
Wu et al.

(10) Patent No.: US 7,467,223 B2
(45) Date of Patent: Dec. 16, 2008

(54) TCP-FRIENDLY MARKERS AND METHODS USING TOKEN BUCKETS

(75) Inventors: Haitao Wu, Beijing (CN); Keping Long, Beijing (CN); Shiduan Cheng, Beijing (CN); Jian Ma, Beijing (CN); Qian Wang, Beijing (CN); Runtong Zhang, Beijing (CN)

(73) Assignee: Nokia Inc., Irvine, TX (US)

( * ) Notice: Subject to any disclaimer, the term of this patent is extended or adjusted under 35 U.S.C. 154(b) by 761 days.

(21) Appl. No.: 10/676,576

(22) Filed: Sep. 30, 2003

(65) Prior Publication Data

US 2005/0080918 A1 Apr. 14, 2005

(51) Int. Cl.
*G06F 15/173* (2006.01)
*G06F 11/00* (2006.01)

(52) U.S. Cl. .................. 709/238; 709/240; 370/229; 370/235.1

(58) Field of Classification Search ................. 709/224, 709/225, 229, 240, 238; 370/230–235, 229, 370/239.1, 412–418
See application file for complete search history.

(56) References Cited

U.S. PATENT DOCUMENTS

| | | | | |
|---|---|---|---|---|
| 6,643,260 B1* | 11/2003 | Kloth et al. | ................. | 370/235 |
| 6,870,812 B1* | 3/2005 | Kloth et al. | ................. | 370/235 |
| 6,996,117 B2* | 2/2006 | Lee et al. | ................. | 370/429 |
| 7,027,395 B2* | 4/2006 | Elloumi et al. | ................. | 370/231 |
| 7,085,236 B2* | 8/2006 | Oldak et al. | ............. | 370/235.1 |
| 7,088,678 B1* | 8/2006 | Freed et al. | ................. | 370/230 |
| 7,263,063 B2* | 8/2007 | Sastry et al. | ................. | 370/235 |
| 7,280,477 B2* | 10/2007 | Jeffries et al. | ................ | 370/235 |
| 2002/0031089 A1* | 3/2002 | Elloumi et al. | ............... | 370/235 |
| 2002/0087715 A1* | 7/2002 | De Cnodder et al. | ........ | 709/235 |
| 2003/0086413 A1* | 5/2003 | Tartarelli et al. | ............ | 370/352 |

OTHER PUBLICATIONS

Blake, S. et al.; "*An Architecture for Differentiated Services*"; Network Working Group; RFC 2475; Dec. 1998; 34 pages. URL: http://www.ietf.org/rfc/rfc2475.txt?number=2475.

Nichols, K. et al.; "*Definition of the Differentiated Services Field (DS Field) in the IPv4 and IPv6 Headers*"; Network Working Group; RFC 2474; Dec. 1998; 19 pages. URL: http://www.ietf.org/rfc/rfc2474.txt?number=2474.

Feng, Wu-Chang et al.; "*Adaptive Packet Marking for Providing Differentiated Services in the Internet*"; date unknown; 10 pages.

Nandy, B. et al.; "*Intelligent Traffic Conditioners for Assured Forwarding Based on Differentiated Services Networks*"; High Performance Networking 2000 Conference, Paris, France; May 2000; 16 pages.

(Continued)

*Primary Examiner*—Ario Etienne
*Assistant Examiner*—Sargon N Nano
(74) *Attorney, Agent, or Firm*—Squire, Sanders & Dempsey

(57) ABSTRACT

Systems and methods are disclosed for marking a packet with a precedence value in a TCP-friendly way. One system and method marks packets with a precedence value based on a probability function. Another system and method marks packets with one of three precedence values based on network traffic but enables interleaving of differently marked packets when a certain number of packets have been successively marked with a low or medium precedence value.

30 Claims, 6 Drawing Sheets

OTHER PUBLICATIONS

Azeem, Feroz et al. "*TCP-Friendly Traffic Conditioners for Differentiated Services*"; Department of ECSE, Rensselaer Polytechnic Institute, Troy, NY; 1999; pp. 1-13.

Ibanez, J et al.; "*Preliminary Simulation Evaluation of an Assured Service*"; Internet Draft; Internet Engineering Task Force; Aug. 1998; pp. 1-19; <draft-ibanez-diffserv-assured-eval-00.txt>.

Clark, David D. et al.; "*Explicit Allocation of Best-Effort Packet Delivery Service*"; IEEE/ACM Transactions of Networking; Aug. 1998; pp. 362-373; vol. 6, No. 4; Copyright 1998 IEEE.

Heinanen, J et al.; "*A two Rate Three Color Marker*"; Network Working Group; RFC2698; Sep. 1999; 5 pages. URL: http://www.ietf.org/rfc/rfc2698.txt?number=2698.

Heinanen, J. et al.; "*A Single Rate Three Color Marker*"; Network Working Group; RFC 2697; Sep. 1999; 6 pages. URL: http://www.ietf.org/rfc/rfc2697.txt?number=2697.

Jacobson, V. et al.; "*An Expedited Forwarding PHB*"; Network Working Group; RFC 2598; Jun. 1999; 11 pages. URL: http://www.ietf.org/rfc/rfc2598.txt?number=2598.

Heinanen, J. et al.; "*Assured Forwarding PHB Group*"; Network Working Group; RFC 2597; Jun. 1999; 11 pages. URL: http://www.ietf.org/rfc/rfc2597.txt?number=2597.

Bernet, Y. et al.; "*A Framework for Differentiated Services*"; IETF Internet Draft; Feb. 1999; pp. 1-35; <draft-ietf-diffserv-framework-02.txt>.

Feroz, Azeem, et al.; "*A TCP-Friendly Traffic Marker for IP Differentiated Services*"; Department of ECSE, Rensselaer Polytechnic Institute, Troy, NY; 1999; 19 pages.

Heinanen, Juha, et al.; "*A Three Color Marker*"; Internet Draft; Internet Engineering Task Force; Feb. 1999; pp. 1-4; <draft-heinanen-diffserv-tcm-01.txt>.

Fall, Kevin et al.; "*Simulation-based Comparisons of Tahoe, Reno, and SACK TCP*"; Lawrence Berkeley National Laboratory; CCR; vol. 26, No. 3; Jul. 1996; 17 pages.

Floyd, Sally et al.; "*Random Early Detection Gateways for Congestion Avoidance*"; Lawrence Berkeley Laboratory; IEEE/ACM Transactions on Networking, vol. 1, No. 4; Aug. 1993; 32 pages.

Bagal, Prasad et al.; "*Comparative study of RED, ECN and TCP Rate Control*"; Technical Report; Mar. 1999; 27 pages. URL: http://www.ecse.rpi.edu/Homepages/shivkuma/research/papers-rpi.html.

Fang, W. et al.; "*A Time Sliding Window Three Colour Marker (TSWTCM)*"; Network Working Group; RFC 2859; Jun. 2000; 9 pages.

Sahu; Sambit et al.; "*On Achievable Service Differentiation with Token Bucket Marking for TCP*"; UMASS CMPSci Tech Report; Copyright 2000 ACM; pp. 23-33.

Lin, Dong et al.; "*Dynamics of Random Early Detection*"; SIGCOMM '97; Aug. 1997; pp. 127-137.

Kim, Hyogon; "*A Fair Marker*"; Internet Draft; Internet Engineering Task Force; Apr. 1999; pp. 1-9; <draft-kim-fairmarker-diffserv-00.txt>.

Feroz, Azeem et al.; "A TCP-Friendly Traffic Marker for IP Differentiated Services"; Copyright 2000 IEEE; pp. 138-147.

Heinanen et al., "A Two-Rate Three Color Marker," IETF Standard, Internet Engineering Task Force, Sep. 1999, pp. 1-5.

Heinanen et al., "A Three Color Marker," IETF Standard-Working-Draft, Internet Engineering Task Force, Feb. 1999, pp. 1-4.

Steven Blake; "Some Issues and Applications of Packet Marking For Differentiated Services"; Internet engineering Task force, IBM Corporation; Dec. 1997, pp. 1-41.

\* cited by examiner

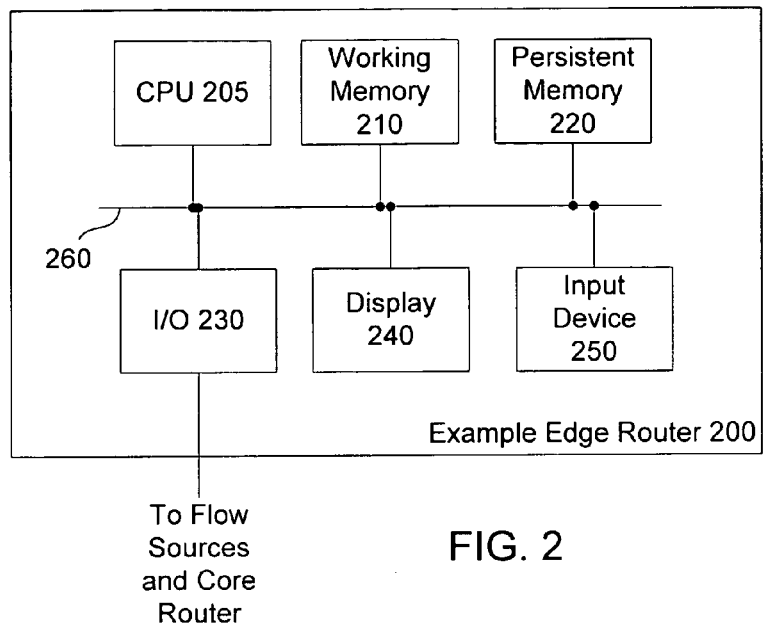
FIG. 2
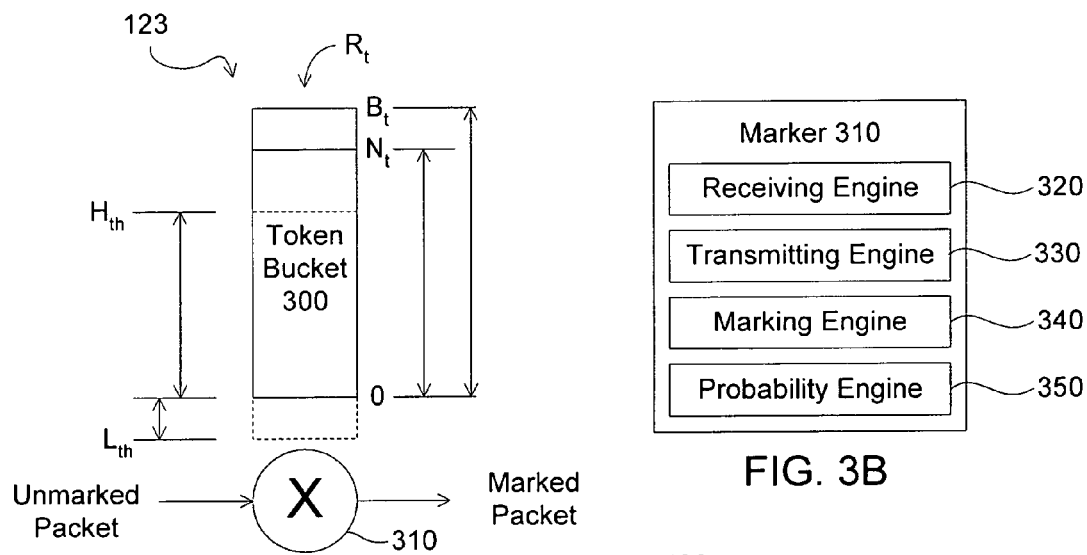
FIG. 3A
FIG. 3B
FIG. 4

TCP-FRIENDLY MARKERS AND METHODS USING TOKEN BUCKETS

TECHNICAL FIELD

This invention relates generally to marking packets, and more particularly, but not exclusively, provides TCP-friendly markers and methods for marking packets for a particular forwarding treatment using at least one token bucket.

BACKGROUND

The Internet Engineering Task Force (IETF) has defined a differentiated services (DS) field in IPv4 and IPv6 packet headers. The fields are disclosed in RFC 2474 and RFC 2475. The DS field is used to mark packets for differentiated classes of services for Internet traffic, to support various types of applications and specific business requirements. By marking a packet's DS field, the packet will receive a certain forwarding treatment, or per-hop behavior, at each network node. For example, some packets might be more likely to be dropped than other packets based on their markings. Accordingly, a packet that is "important" and marked with a high precedence level (e.g., from a voice over IP application) would be less likely to be dropped than an "unimportant" packet with a low precedence level (e.g., a packet from website).

However, the DS standard implemented by the IETF has several shortcomings. One limitation of the DS standard is that Transmission Control Protocol (TCP) applications are still influenced by bursty packet loss behavior. For instance, TCP Reno may timeout with the dropping of three consecutive packets. Another limitation of the DS standard is that it does not necessarily handle packets from a plurality of flows to a single aggregate in a fair manner. For example, a first flow might be able to monopolize a TCP application to the detriment of other flows. Accordingly, the first flow would have its packets marked with a high precedence while packets from other flows might be marked with a lower precedence, leading to packet loss from the other flows.

Therefore, a new marker and method are needed that overcome the shortcomings described above.

SUMMARY

The present invention provides TCP-friendly markers. In an embodiment of the invention, the marker comprises a receiving engine, a marker engine, and a probability engine. The receiving engine receives a packet for marking. The marker engine, which is communicatively coupled to the receiving engine, determines the number of tokens in a token bucket. The probability engine, which is communicatively coupled to the marker engine, calculates a probability for marking received packets with a low precedence when the number of tokens in the token bucket are between a first threshold and a second threshold.

In another embodiment of the invention, the marker comprises a receiving engine, a marker engine, and an upgrade engine. The receiving engine receives a packet. The marker engine, which is communicatively coupled to the receiving engine, determines a number of tokens in a first token bucket and also determines a precedence value for marking the packet based on the determined number of tokens. The upgrade engine, which is communicatively coupled to the marker engine, upgrades the determined precedence value to a higher precedence value when a pre-specified number of previously received packets were marked with the same determined precedence value.

The present invention further provides methods for marking a packet. In one embodiment, the method comprises: receiving a packet; determining a number of tokens in a token bucket; and calculating a probability for marking the received packet with a low precedence when the number of tokens in the token bucket are between a first threshold and a second threshold.

In another embodiment of the invention, the method comprises: receiving a packet; determining a number of tokens in a first token bucket; determining a precedence value for marking the packet based on the determined number of tokens; and upgrading the determined precedence value to a higher precedence value when a pre-specified number of previously received packets were marked with the same determined precedence value.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a block diagram illustrating an example edge router according to an embodiment of the invention;

FIG. 3A is a block diagram illustrating a marker system according to an embodiment of the invention;

FIG. 3B is a block diagram illustrating the marker of the marker system of FIG. 3A;

FIG. 4 is a diagram illustrating a packet marked by the marker system of FIG. 3A;

DETAILED DESCRIPTION

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
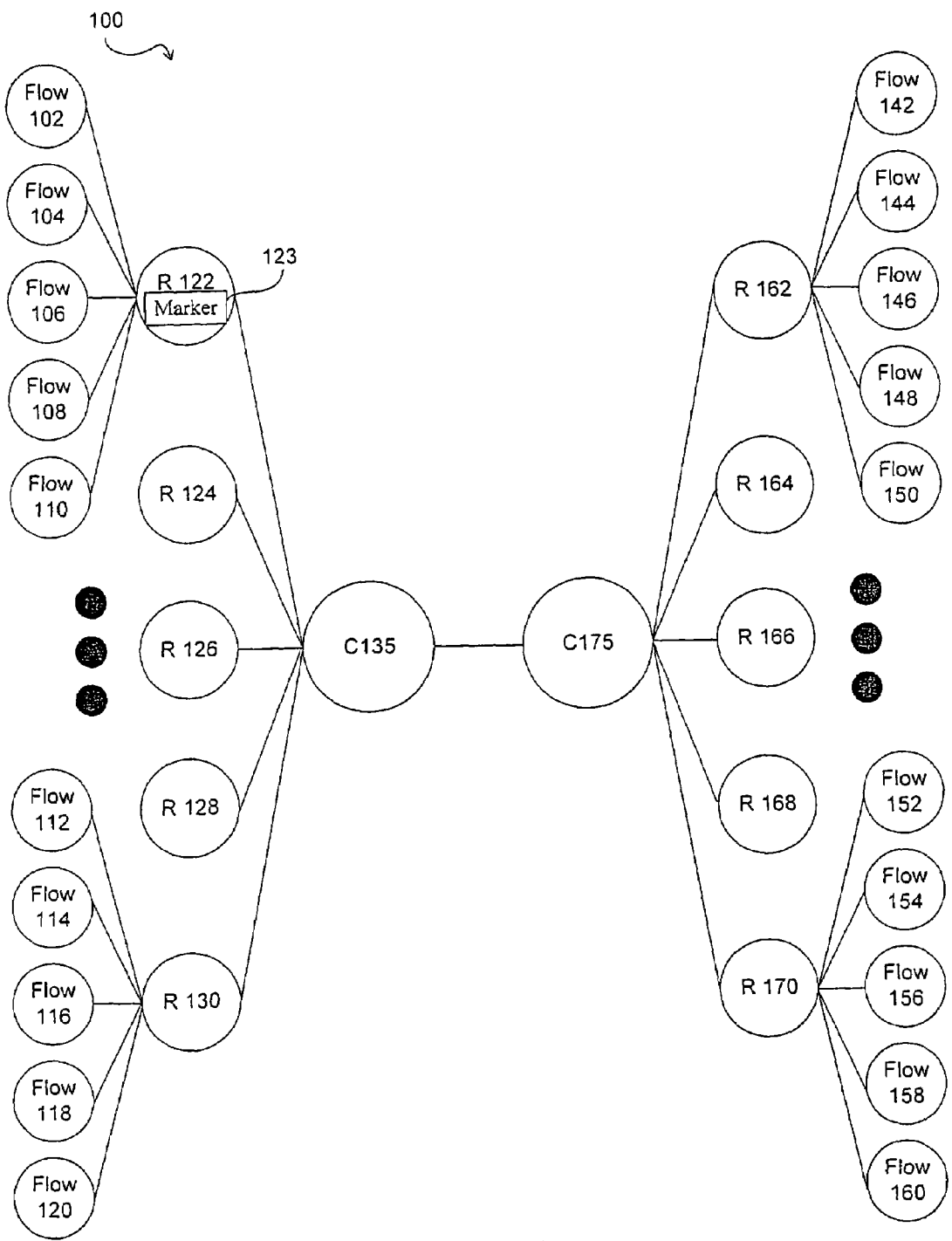
FIG. 1 is a block diagram illustrating a network system in accordance with an embodiment of the invention.

FIG. 1 is a block diagram illustrating a network system 100 in accordance with an embodiment of the invention. The network system 100 includes a plurality of flow sources 102, 104, 106, 108, 110, 112, 114, 116, 118, 120, 142, 144, 146, 148, 150, 152, 154, 156, 158, 160, and others not shown. The network system 100 also includes edge routers 122, 124, 126, 128, 130, 162, 164, 166, 168, and 170 and core routers 135 and 175. Each edge router 122, 124, 126, 128, 130, 162, 164, 166, 168, and 170 includes a marker system, such as a marker system 123 resident on the edge router 122. The marker system 123 will be described in further detail in conjunction with FIG. 3.

The flow sources 102-110 are each communicatively coupled to the edge router 122. The flow sources 112-120 are each communicatively coupled to the edge router 130. The flow sources 142-150 are each communicatively coupled to the edge router 162. The flow sources 152-160 are each communicatively coupled to the edge router 170. The edge routers 122-130 are each communicatively coupled to a core router 135. The edge routers 162-170 are each communicatively coupled to a core router 175. The core routers 135 and 175 are communicatively coupled to each other, thereby forming a bottleneck. One of ordinary skill in the art will recognize that the network system 100 can comprise additional or fewer flow sources, edge routers, and/or core routers.

During operation of the network system 100, flow sources send data to edge routers, which then forward the date to a core router. The edge routers, using the marker system 123, mark the packets as either 'In' or 'Out' which effects the packets' forwarding treatment by a core router. In packets are classified as more "important" (i.e., higher precedence) than Out packets and are therefore less likely to be dropped by a core router. The system and method of marking packets according to various embodiments of the invention will be described in further detail below.

In an example, flow sources 102-110 each send packets to edge router 122, which uses the marker system 123 to mark the packets In or Out and then transmits the packets to the core router 135. Based on each packet marking, the core router 135, using conventional routing technology, will treat each packet differently. If traffic is light, all packets regardless of their respective marking will most likely be forwarded. If traffic is extremely heavy, the core router 135 is more likely to forward packets marked In than packets marked Out, i.e., the core router 135 may drop packets marked Out.

FIG. 2 is a block diagram illustrating an example edge router 200 according to an embodiment of the invention. In an embodiment of the invention, the marker system 123 may be resident on an edge router substantially similar to the example edge router 200. In an embodiment of the invention, the edge routers 122, 124, 126, 128, 130, 162, 164, 166, 168, and 170 are substantially similar to the example edge router 200. The example edge router 200 includes a central processing unit (CPU) 205; working memory 210; persistent memory 220; input/output (I/O) interface 230; display 240 and input device 250, all communicatively coupled to each other via a bus 260. CPU 205 may include an Intel Pentium® microprocessor, a Motorola PowerPC® microprocessor, or any other processor capable to execute software stored in persistent memory 220. Working memory 210 may include random access memory (RAM) or any other type of read/write memory devices or combination of memory devices. Persistent memory 220 may include a hard drive, read only memory (ROM) or any other type of memory device or combination of memory devices that can retain data after example computer 200 is shut off. I/O interface 230 is communicatively coupled, via wired or wireless techniques, to flow sources and a core router. Display 240 may include a cathode ray tube display or other display device. Input device 250 may include a keyboard, mouse, or other device for inputting data, or a combination of devices for inputting data.

One skilled in the art will recognize that the example edge router 200 may also include additional devices, such as network connections, additional memory, additional processors, LANs, input/output lines for transferring information across a hardware channel, the Internet or an intranet, etc. One skilled in the art will also recognize that the programs and data may be received by and stored in the system in alternative ways.

FIG. 3A is a diagram illustrating a marker system 123 according to an embodiment of the invention. The marker system 123 comprises a token bucket 300 and a marker 310 that is communicatively coupled to the token bucket 300. The token bucket 300 has a token capacity $B_T$, a high threshold $H_{th}$, a low threshold $L_{th}$, and holds a variable number of tokens $N_T$. A token bucket is generally similar to a counter that is increased linearly as a function of time and decreased as function of the number and size of packets that are marked. The token bucket 300 can be filled with tokens at a rate of $R_T$ and is measured in bytes of IP packets per second (i.e., in includes the IP packet header but not link specific headers). $B_T$, $L_{th}$, and $H_{th}$ are all measured in bytes. $B_T$ and $H_{th}$ are positive non-zero values while $L_{th}$ is a negative value. In a preferred embodiment, $(B_T-H_{th})$ and $-L_{th}$ are greater than the size of the largest possible IP packet received from a flow source. In an embodiment of the invention, $H_{th}$ is equal to $B_T/2$ and $-L_{th}$ is much less than $H_{th}$. In one embodiment, $B_T$ is equal to 50 kbytes; $H_{th}$ is equal to 25 kilobytes; $L_{th}$ is equal to −2.5 kbytes; and $R_T$ is set to a target rate of the edge routers, e.g., 1 Mbps.

The marker 310 marks packets from flow sources as either In or Out based on the parameters and variables described above and other parameters and variables. The marking occurs in the DS or TOS field of IP packets, as will be discussed in further detail in conjunction with FIG. 4 below. The other parameters include the maximum probability of marking a packet out $P_{out}$, while the other variables include the current probability of marking a packet out p, and three flag variables Mflag, Tflag1, and Tflag2 as will be discussed further below in conjunction with FIG. 5 and FIG. 6. The marker 310 will be discussed in further detail in conjunction with FIG. 3B.

During operation of the marker system 123, tokens are constantly added to the token bucket 300 at rate $R_T$. In addition, the number of tokens $N_T$ in the token bucket 300 are constantly reduced by the size of packets marked by the marker system 123. Accordingly, the number of tokens $N_T$ in the token bucket 300 are inversely proportional to the traffic from the flow sources. A large number of tokens $N_T$ means that traffic is light while a low number of token $N_T$ means that traffic is heavy. Accordingly, the marker 310 is more likely to mark packets as Out the smaller $N_T$ is. More specifically, the marker 310 marks packets In when $N_T$ is greater than $H_{th}$ and marks packets out when $N_T$ is less than $L_{th}$. When $N_T$ is between $L_{th}$ and $H_{th}$, the marker 310 marks packets Out according to a probability function such that, generally, the probability of being marked Out is inversely proportional to $N_T$. However, to encourage interleaving of an In and Out packets so as to prevent timeouts downstream, the probability of marking a packet Out is reduced when a previously marked packet was marked Out. The probability function will be described in further detail in conjunction with FIG. 5 and FIG. 6.

The advantages of using the marker system 123 include converting In burst and Out burst traffic into interleaved non-burst In and Out traffic, which is friendlier to TCP traffic and can make core routers in DS architectures, such as RED, RIO, or Multi-RED perform better, i.e., less delay and reduced packet loss in the core router. In addition, the marker system 123 can bring fairness to flows originating from the same subscriber network. For example, if edge router 122 is experiencing heavy traffic from its flow sources 102-110, it will start marking packets as Out, thereby giving traffic from edge router 130 a chance to be forwarded by the core router 135. In addition, the marker system 123 can be easily adapted to a three-color marker system (i.e., three different levels of drop precedence) as will be described further below in conjunct with FIG. 5. A further advantage of the marker system 123 is that is requires less overhead than conventional systems because it does not need to main per-connection information. Additionally, in comparison to DS, the token bucket size $B_T$ is not fixed and can adjust adaptively based on the network resource situation (i.e., it can be set to the target rate).

FIG. 3B is a block diagram illustrating the marker 310 of the marker system 123. The marker 310 includes a receiving engine 320; a transmitting engine 330; a marking engine 340; and a probability engine 340. The receiving engine 320 receives packets from flow sources for marking as either In or Out. The transmitting engine 330 transmits received packets to a core router after the packets have been marked. The marking engine 340 marks packets as either In or Out. The probability engine 350 calculates a probability for marking a packet Out when the token bucket 300 has a certain number of tokens. The method of marking packets by the marking engine 340 will be discussed in further detail in conjunction with FIG. 5. The probability calculations made by the probability engine 350 will be discussed in further detail in conjunct with FIG. 5 and FIG. 6.

FIG. 4 is a diagram illustrating a packet 400 marked by the marker system 123 (FIG. 3). The packet 400 includes version # field; Internet Header Length (IHL) field; a Type of Service (TOS) field, also referred to as a DS field; a total length field; an identification field; a flags field; a fragment offset field; a time to live field; a protocol field; a header checksum field; a source address field; a destination address field; an options field; and a data field. The marker 310 marks the TOS field with a bit pattern signifying either In or Out. The marker 310 can mark the first 3 bits of the TOS field with 111 for In packets, which is the highest precedence for conventional systems, and can mark the first 3 bits of the TOS field with 000 for Out packet, which is the lowest precedence for conventional systems, thereby ensuring compatibility with conventional systems. The other fields of the IP packet 400 are not relevant to the marker system 123 and therefore not discussed further. Additional information about the other fields in the IP packet can be found in multiple sources including IETF RFCs.

Figure 5:
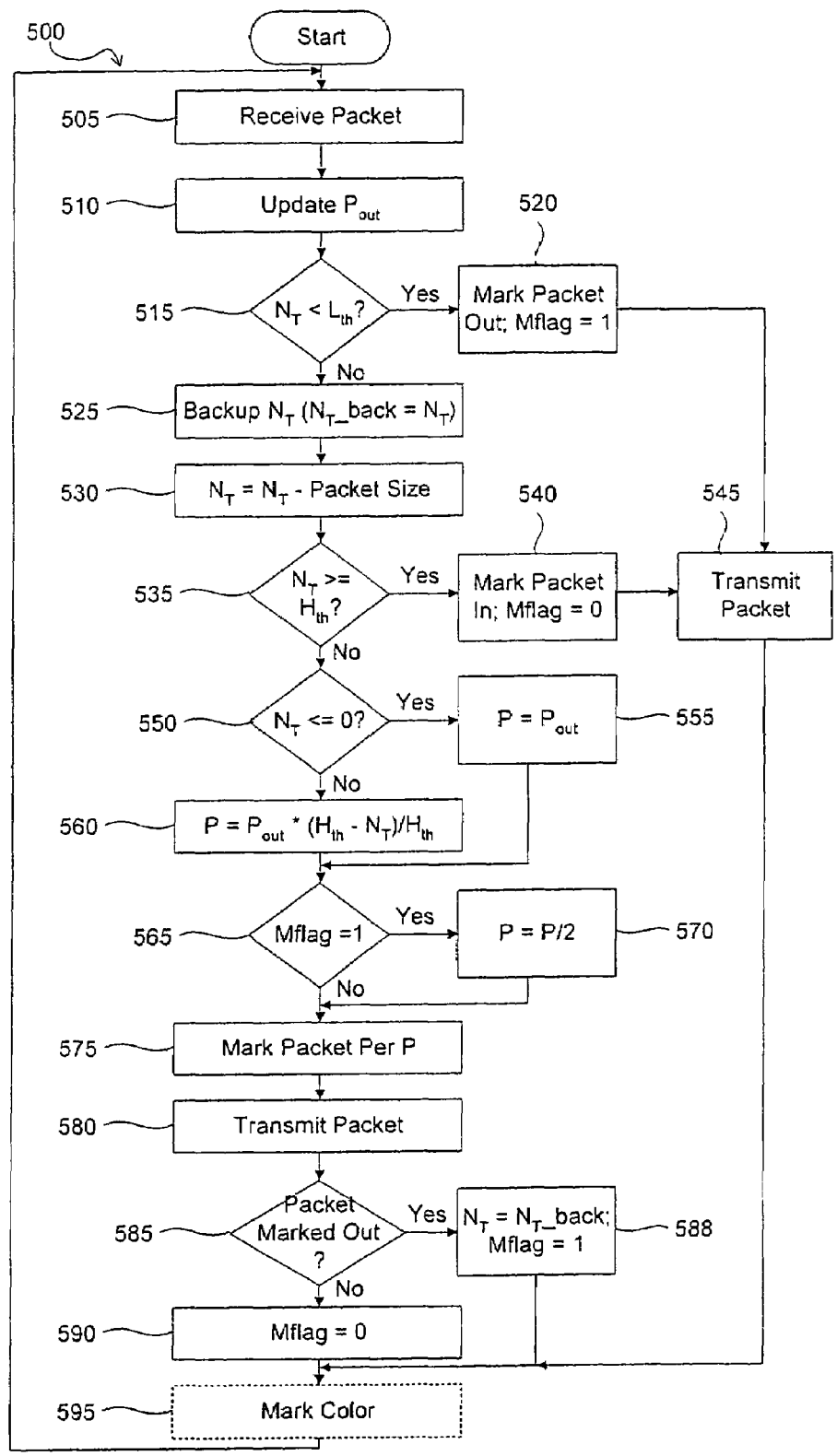
FIG. 5 is a flowchart illustrating a method for marking a packet according to an embodiment of the invention.

FIG. 5 is a flowchart illustrating a method 500 for marking a packet 400. In an embodiment of the invention, the marker system 123 executes the method 500. During operation of the method 500, the quantum bucket 300 is filled at the rate of $R_T$ times per second up to $B_T$. The method 500 begins by receiving (505) a packet from a flow source, such as the flow source 102. Next, a variable $P_{out}$ is updated (510) as will be discussed in further detail in conjunction with FIG. 6. After $P_{out}$ is updated (510), it is determined (515) if $N_T$ is less than $L_{th}$, i.e., is traffic relatively heavy. If $N_T$ is less than $L_{th}$ (i.e., traffic is heavy) then the packet is marked (520) Out (low precedence), Mflag, a variable, is set (520) to 1, and the packet is transmitted (545). IS $N_T$ REDUCED BY PACKET SIZE AT THIS POINT? A color can then be marked (595) as will be discussed further in conjunction with FIG. 7, and the method 500 repeats for a next received packet. Otherwise, the current value of $N_T$ is backed up (525) using a $N_T$ back variable and $N_T$ is subsequently reduced (530) by the size of the packet received (505).

Next, it is determined (535) if $N_T$ is greater than or equal to $H_{th}$ (i.e., is traffic relatively light). If $N_T$ is greater than or equal to $H_{th}$ then the packet is marked (540) In, Mflag is set (540) to 0, and the packet is transmitted (545). A color can then be marked (595) as will be discussed further in conjunction with FIG. 7, and the method 500 repeats for a next received packet. Otherwise, it is next determined (550) if $N_T$ is less than or equal to 0 (i.e., is traffic heavy, but not as heavy as when $N_T$ is less than $L_{th}$). If $N_T$ is less than or equal to 0, then the probability of marking a packet Out, P, is set (555) to $P_{out}$. Otherwise, P is set (560) to a fraction of $P_{out}$, i.e., $$P = P_{out} * \frac{H_{th} - N_T}{H_{th}}.$$

It is next determined (565) if Mflag is equal to 1, i.e., if the previously received packet was marked Out. If Mflag is equal 1, then P is reduced (570) by half to encourage interleaving of In and Out packets, which improves TCP application performance (multiple dropped packets can lead to a timeout). If Mflag is not equal to 1 or after reducing (570) P, the received packet is marked (575) Out according to the probability P, i.e., the higher P is, the more likely a packet will be marked Out. The marked packet is then transmitted (580).

After the packet is transmitted (580), it is determined (585) if the transmitted packet was marked Out. If the packet was marked Out, then $N_T$ is set (588) to its original value and Mflag is set (588) to 1. Otherwise, Mflag is set (590) to 0. In an embodiment of the invention, a color can then be marked (595) and the method 500 repeats for a next received packet. The color marking (595) is used for expanding method 500 for use in a three color marking system, as will be discussed further in conjunction with FIG. 7.

Accordingly, the method 500 encourages interleaving of In and Out packets, which improves TCP application performance. In addition, the method 500 generally marks packet as Out in proportion to the amount of traffic generated by flow sources. This enables fairness as one edge router will therefore be unable to flood a core router with In packets. In addition, the variables used by the token bucket 300 (e.g., $H_{th}$, $L_{th}$, $B_{th}$, $R_T$) need not be fixed. They can be changed according to the network resource situation, leading to a more robust system. In addition, there is less overhead compared to conventional marking systems as no per-connection information need be maintained.

Figure 6:
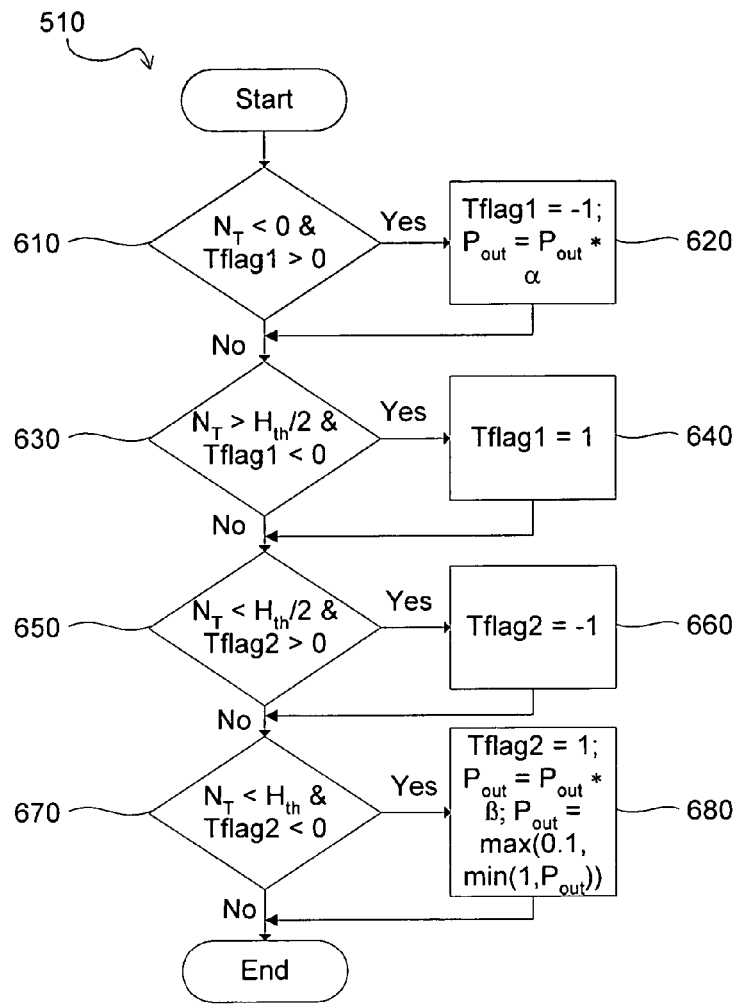
FIG. 6 is a flowchart illustrating a method for updating a probability function for use in the method of marking a packet.

FIG. 6 is a flowchart illustrating a method 510 for updating a probability function for use in the method 500 of marking a packet. The method 510 uses several variables include Tflag1, Tflag2, α, and β. Initially, Tflag1 and Tflag2 can be set to 0, α can be set to 2 and β can be set to 0.75. Generally, a should be more than 1 and β should be set to less than 1. First, it is determined (610) if $N_T$ is less than zero and Tflag1 is greater than 0. If $N_T$ is less than zero and Tflag1 is greater than 0, then Tflag1 is set (620) to −1 and $P_{out}$ is increased (620) by multiplying it by α. Next, it is determined (630) if $N_T$ greater than $H_{th}/2$ & if Tflag1 is less than 0. If $N_T$ greater than $H_{th}/2$ & if Tflag1 is less than 0, Tflag1 is set (640) to 1. Next, it is determined (650) if $N_T$ is less than $H_{th}/2$ and if Tflag2 greater than 0. If $N_T$ is less than $H_{th}/2$ and if Tflag2 greater than 0, Tflag2 is set (660) to −1. Next, it is determined (670) if $N_T$ is less than $H_{th}$ and Tflag2 is less than 0. If $N_T$ is less than $H_{th}$ and Tflag2 is less than 0, then Tflag2 is set (680) to 1 and $P_{out}$ is decreased (680) by multiplying it by β. The method 510 then ends.

Figure 7:
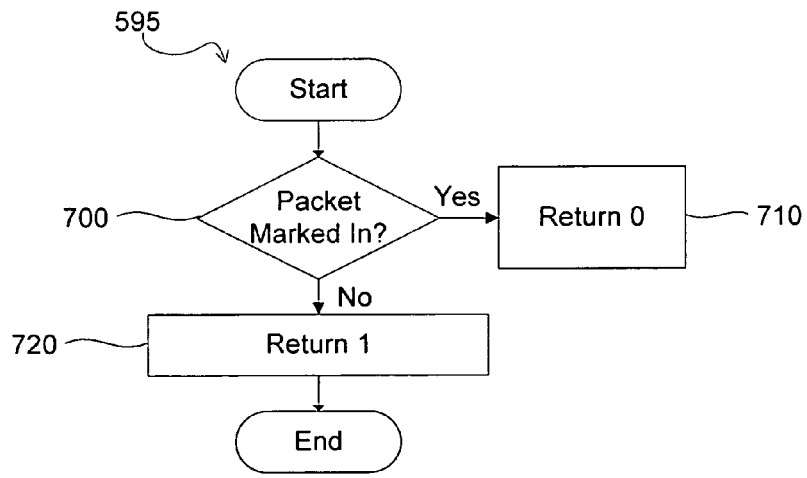
FIG. 7 is a flowchart illustrating method of color marking.

FIG. 7 is a flowchart illustrating method 595 of color marking. The method 595 is used to return either a 0 or a 1 based on the packet marking done in method 500. The returned value can then be used in expanding method 500 into three-color (i.e., precedence) marker. For example, a three color marker can be implement using an AF class per Nichols, K., Blake, S., Baker, F. and D. Black, "Definition of the Differentiated Services Field (DS Field) in the IPv4 and IPv6 Headers", RFC 2474, December 1998 and Blake, S., Black, D., Carlson, M., Davies, E., Wang, Z and W. Weiss, "An Architecture for Differentiated Services", RFC 2475, December 1998, which are hereby incorporated by reference.

Figure 8A:
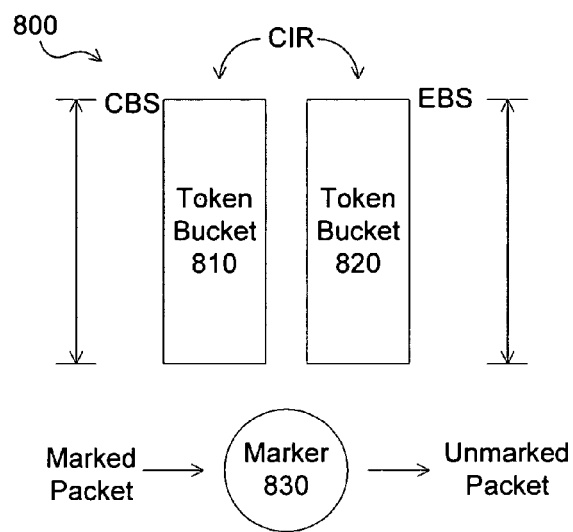
FIG. 8A is a block diagram illustrating a marker system according to another embodiment of the invention.

FIG. 8A is a block diagram illustrating a marker system 800 according to another embodiment of the invention. The marker system 800, like the marker system 123, can be resident in an edge router and generally features the same advantages. The marker system 800 includes a first token bucket 810, a second token bucket 820, and a marker 830. Token buckets 810 and 820 are both filled with tokens at a Committed Information Rate (CIR), e.g., 1 Mbps and have a token capacity of Committed Burst Size (CBS) and Excess Burst Size (EBS) respectively. The CBS and EBS can be equal or non-equal with at least either the CBS or EBS being larger then zero. In an embodiment of the invention, CBS is equal to 50 kbytes and EBS is equal to 80 kbytes.

The marker 830, as will be discussed in further detail in conjunction with FIG. 8B, marks packets as green (high precedence), yellow (medium precedence), or red (low precedence) based on traffic volume as indicated by the number of tokens in the token buckets 810 and 820. Traffic volume is inversely proportional to the combined number. of tokens in the buckets 810 and 820. The marker 830 can mark the first 3 bits of the TOS or DS field of a packet. Examples of markings include 111 for green, 011 for yellow, and 000 for red. These markings correspond with high, medium and low precedence in IETF standards and are therefore compatible with conventional routing systems.

During operation of the marker system 800, the token buckets 810 and 820 are each filled with tokens at a constant rate. Tokens are removed first from the token bucket 810 for each packet marked green. Once the token bucket 810 is depleted of tokens, tokens are removed from the token bucket 820 and the marker 830 marks packets yellow. Once tokens are depleted from both the token buckets 810 and 820, the marker 830 marks packets red. However, to enable a TCP-friendly policy of interleaving different colored packets to prevent aggregated burst loss (which can lead to timeouts), the marker 830 overdrafts, or borrows, tokens allotted to the token buckets 810 and 820 in the future to enable the marker 830 to upgrade packets yellow or green. The marker 830 only overdrafts tokens once a certain number (e.g., between 0 and the packet size) of consecutive packets were marked yellow or red.

It will be appreciated by one of ordinary skill in the art that the marker system 800 can be adapted to include a single token bucket instead of two token buckets 810 and 820. Accordingly, the marker 830 will only mark packets with one of two colors (i.e., precedence values).

Figure 8B:
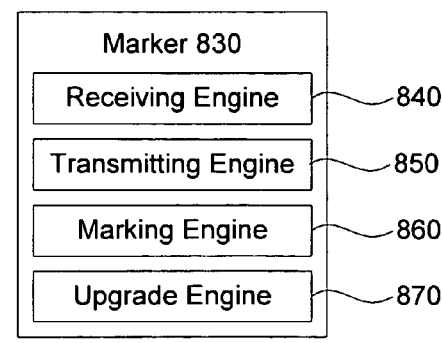
FIG. 8B is a block diagram illustrating the marker of the marker system of FIG. 8A.

FIG. 8B is a block diagram illustrating the marker 830 of the marker system 800 (FIG. 8A). The marker 830 includes a receiving engine 840; a transmitting engine 850; a marking engine 860; and an upgrade engine 870. The receiving engine 840 receives packets from a flow source. The transmitting engine 850 transmits marked packets to core routers. The marking engine 860 marks packets as a function of the number of tokens in the token buckets 810 and 820. The upgrade engine 870 borrows tokens from the future to enable to the marking engine 860 to mark packets at higher precedence than the packets would normally be entitled to. The functioning of the marking engine 860 and the upgrade engine 870 will be discussed in further detail in conjunction with FIG. 9.

Figure 9:
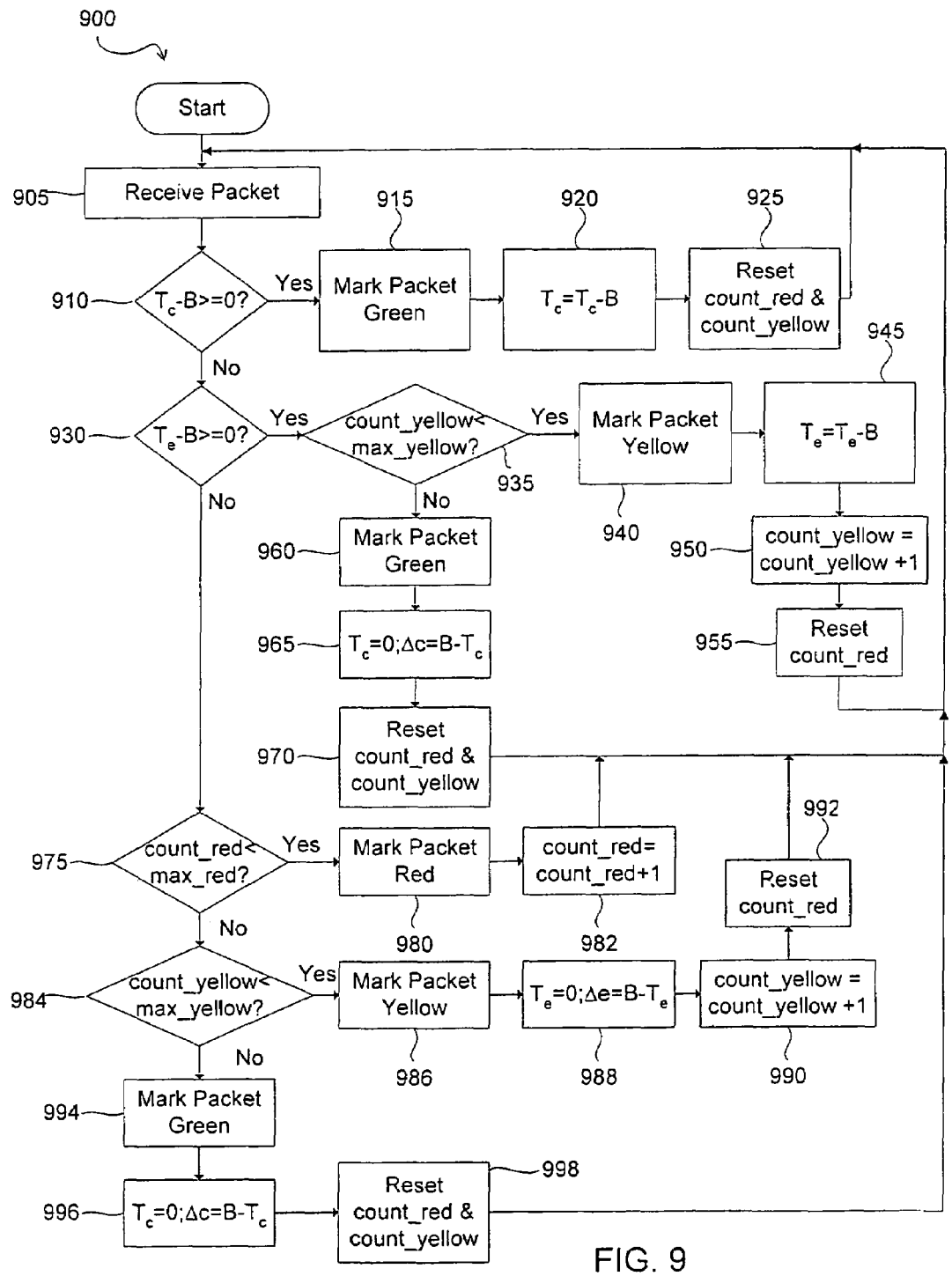
FIG. 9 a flowchart illustrating a method of marking a packet according to an embodiment of the invention.

FIG. 9 a flowchart illustrating a method 900 of marking a packet according to an embodiment of the invention. The method 900 generally features the same advantage as the method 500. In an embodiment of the invention, the marker system 800 executes the method 900. During the operation of the method 900, the token buckets 810 and 820 are constantly filled with tokens at the rate CIR. Variables used by the method 900 include B, $T_c$, $T_e$, count_red, count_yellow, max_red, max_yellow, $\Delta c$, and $\Delta e$. B is the size of a received packet. $T_c$ and $T_e$ are the current number of tokens in token buckets 810 and 820 respectively. Count_red and count_yellow and the number of packets that have been successively marked red and yellow respectively. Max_red and max_yellow are the maximum number of successively marked red and yellow packets, respectively, before overdrafting occurs. $\Delta c$ records the overdraft of the token bucket C after a yellow packet is upgraded to a green packet. $\Delta e$ records the overdraft of the token bucket E after a red packet is upgraded to a yellow packet.

First, a packet of size B is received (905). It is next determined (910) if there are enough tokens in the first token bucket 810, i.e., if $T_c - B >= 0$. If there are sufficient tokens, the packet is marked (915) green and transmitted, the number of tokens in token bucket 810 are reduced (920) by B, i.e., $T_c = T_c - B$, and count_red and count_yellow are reset (925) to zero. The method 900 then repeats.

If there are insufficient tokens in the first token bucket 810, it is determined (930) if there are sufficient tokens in the second token bucket 820, i.e., is $T_e - B >= 0$. If there are sufficient tokens, it is next determined (935) if the number of packets successively marked yellow does not exceed the maximum number, i.e., is count_yellow<max_yellow. If count_yellow is less than max_yellow, the received packet is marked (940) yellow and transmitted; the number of token in the token bucket 820 are reduced (945) by B, i.e., $T_e = T_e - B$; count_yellow is incremented (945) by 1; and count_red is reset to 0. The method 900 then repeats for the next received packet. If the number of successively marked yellow packets exceeds the maximum, i.e., count_yellow>max_yellow, then the packet is marked (960) green and transmitted; $T_c$ is set (965) to 0; $\Delta c$ is set (965) to $B - T_c$; and count_red and count_yellow are reset (970) to zero. The method 900 is then repeated for the next received packet.

If it is determined (930) that there are insufficient tokens in the token bucket 820, then it is next determined (975) if the number of successively marked red packets does not exceed the maximum number of successively marked red packets, i.e., is count_red<max_red. If count_red<max_red, then the packet is marked (980) red and transmitted and count_red is incremented (982) by 1. The method 900 then repeats for the next received packet. If count_red>max_red, then it is determined (984) if the number of successively marked yellow packets does not exceed the maximum number of successively marked yellow packets, i.e., if count_yellow<max_yellow. If count_yellow<max_yellow, then the packet is marked (986) yellow and transmitted; $T_e$ is set (988) to 0; $\Delta e$ is set (988) to $B - T_e$; count_yellow is incremented (990) by 1, and count_red is reset (992) to zero. The method 900 then repeats for the next received packet.

If it is determined (984) that count_yellow>max_yellow, then the packet is marked (994) green and transmitted; Tc is set (996) to zero; $\Delta c$ is set (996) to $B - T_c$; and count_red and count_yellow are both reset (998) to zero. The method 900 then repeats for the next received packet.

It will be appreciated that the method 900 can be adapted for use with only a single token bucket in place of the two token buckets 820 and 830. Accordingly, the method 900 would mark packets with only based on two colors (i.e., precedence values). In order to implement this, operations 930 and 975 through 998 would be deleted.

In order to prevent severe overdrafting, at pre-specified intervals, Exce_c is set equal to the total overdraft of token bucket C and Exce_e is set equal to the total overdraft of token bucket E. When Exce_c exceeds a pre-assigned threshold, it marks an additional red packet to reduce the consumption of green tokens. When Exce_e exceeds its pre-assigned threshold, it regards this stream as a malicious user and marks red continuously until Exce_e=0.

The foregoing description of the illustrated embodiments of the present invention is by way of example only, and other variations and modifications of the above-described embodiments and methods are possible in light of the foregoing teaching. For example, the marking systems disclosed herein can be implemented with additional token buckets to increase the number of precedence levels. Although the network sites are being described as separate and distinct sites, one skilled in the art will recognize that these sites may be a part of an integral site, may each include portions of multiple sites, or may include combinations of single and multiple sites. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method, comprising:
    receiving a packet;
    determining a number of tokens in a token bucket;
    calculating a probability for marking the received packet with a precedence level when the number of tokens in the token bucket are between a first threshold and a second threshold; and
    marking the packet for a particular forwarding treatment using at least one token bucket,
    wherein, there is an increased probability of marking the packet with a higher precedence level than a previously marked packet if the previously marked packet had a low precedence level.

2. The method of claim 1, further comprising: marking the packet with a high precedence level if the number of tokens exceeds a first threshold.

3. The method of claim 1, further comprising:
    marking the packet with a low precedence level if the number of tokens is less than a second threshold, wherein the second threshold is lower than the first threshold.

4. The method of claim 1, further comprising:
    marking the packet with a low precedence value or a high precedence value based on the calculated probability when the number of tokens in the token bucket are between the first and second thresholds.

5. The method of claim 4, wherein the probability of marking the received packet with a low precedence is lowered when a previously received packet was marked with a low precedence.

6. The method of claim 1, wherein the number of tokens in the token bucket are inversely proportional to the amount of network traffic.

7. The method of claim 6, wherein the probability of marking the received packet with a low precedence is inversely proportional to the number of tokens in the token bucket.

8. A system, comprising:
    a receiving engine configured to receive a packet to be marked;
    a marker engine, communicatively coupled to the receiving engine, configured to determine the number of tokens in a token bucket;
    a probability engine, communicatively coupled to the marker engine, configured to calculate a probability to be used to mark the received packet with a precedence level when the number of tokens in the token bucket are between a first threshold and a second threshold; wherein
    the marking engine is configured to mark packet for a particular forwarding treatment using at least one token bucket,
    wherein, there is an increased probability of that the packet will be marked with a higher precedence level than a previously marked packet if the previously marked packet had a low precedence level.

9. The system of claim 8, wherein the marker engine is further capable of marking the packet with a high precedence level if the number of tokens exceeds a first threshold.

10. The system of claim 8, wherein the marker engine is further capable of marking the packet with a low precedence level if the number of tokens is less than a second threshold, wherein the second threshold is lower than the first threshold.

11. The system of claim 8, wherein the marker engine is further capable of marking the packet with a low precedence value or a high precedence value based on the calculated probability when the number of tokens in the token bucket are between the first and second thresholds.

12. The system of claim 11, wherein the probability of marking the received packet with a low precedence is lowered when a previously received packet was marked with a low precedence.

13. The system of claim 8, wherein the number of tokens in the token bucket are inversely proportional to the amount of network traffic.

14. The system of claim 13, wherein the probability of marking the received packet with a low precedence is inversely proportional to the number of tokens in the token bucket.

15. A computer program embodied on a computer readable medium, said computer program configured to control a processor to perform:
    receiving a packet;
    determining a number of tokens in a token bucket;
    calculating a probability for marking the received packet with a precedence level when the number of tokens in the token bucket are between a first threshold and a second threshold; and
    marking the packet for a particular forwarding treatment using at least one token bucket,
    wherein, there is an increased probability of marking the packet with a higher precedence level than a previously marked packet if the previously marked packet had a low precedence level.

16. A system, comprising:
    receiving means for receiving a packet;
    determining means for determining a number of tokens in a token bucket;
    calculating means for calculating a probability for marking the received packet with a precedence level when the number of tokens in the token bucket are between a first threshold and a second threshold; and
    marking means for marking the packet for a particular forwarding treatment using at least one token bucket, wherein, there is an increased probability of marking the packet with a higher precedence level than a previously marked packet if the previously marked packet had a low precedence level.

17. A method, comprising:
receiving a packet;
determining a number of tokens in a first token bucket;
determining a precedence value used to mark the packet based on the determined number of tokens;
upgrading the determined precedence value to a higher precedence value when a pre-specified number of previously received packets were marked with the same determined precedence value; and
marking the packet for a particular forwarding treatment using at least one token bucket.

18. The method of claim 17, wherein the previously received packets were marked with the same determined precedence value in succession.

19. The method of claim 17, wherein the precedence value is inversely proportional to the determined number of tokens.

20. The method of claim 17, further comprising:
determining a number of tokens in a second token bucket and wherein the determining a precedence value is based on the number of tokens in the second token bucket if the first token bucket has tokens less than a size of the received packet.

21. The method of claim 17, further comprising marking the packet with the determined precedence value or the upgraded precedence value.

22. A system, comprising:
a receiving engine configured to receive a packet;
a marker engine, communicatively coupled to the receiving engine, configured to determine a number of tokens in a first token bucket and configured to determine a precedence value used to mark the packet based on the determined number of tokens; and
an upgrade engine, communicatively coupled to the marker engine, configured to upgrade the determined precedence value to a higher precedence value when a pre-specified number of previously received packets were marked with the same determined precedence value, wherein
the marking engine is configured to mark the packet for a particular forwarding treatment using at least one token bucket.

23. The system of claim 22, wherein the previously received packets were marked with the same determined precedence value in succession.

24. The system of claim 22, wherein the precedence value is inversely proportional to the determined number of tokens.

25. The system of claim 22, wherein the marker engine is further capable of determining a number of tokens in a second token bucket and the marker determines a precedence value based on the number of tokens in the second token bucket if the first token bucket has tokens less than a size of the received packet.

26. The system of claim 22, wherein the marker engine is further capable of marking the packet with the determined precedence value or the upgraded precedence value.

27. A computer program embodied on a computer readable medium, said computer program configured to control a processor to perform:
receiving a packet;
determining a number of tokens in a first token bucket;
determining a precedence value used to mark the packet based on the determined number of tokens;
upgrading the determined precedence value to a higher precedence value when a pre-specified number of previously received packets were marked with the same determined precedence value; and
marking the packet for a particular forwarding treatment using at least one token bucket.

28. A system, comprising:
receiving means for receiving a packet;
token determining means for determining a number of tokens in a first token bucket;
precedence value determining means for determining a precedence value for marking the packet based on the determined number of tokens;
upgrading means for upgrading the determined precedence value to a higher precedence value when a pre-specified number of previously received packets were marked with the same determined precedence value; and
packet marking means for marking the packet for a particular forwarding treatment using at least one token bucket.

29. An apparatus, comprising:
a receiving engine configured to receive a packet to be marked;
a marker engine, communicatively coupled to the receiving engine, configured to determine the number of tokens in a token bucket; and
a probability engine, communicatively coupled to the marker engine, configured to calculate a probability to be used to mark the received packet with a precedence level when the number of tokens in the token bucket are between a first threshold and a second threshold wherein
the marking engine is configured to mark packet for a particular forwarding treatment using at least one token bucket,
wherein, there is an increased probability of that the packet will be marked with a higher precedence level than a previously marked packet if the previously marked packet had a low precedence level.

30. An apparatus, comprising:
a receiving engine configured to receive a packet;
a marker engine, communicatively coupled to the receiving engine, configured to determine a number of tokens in a first token bucket and configured to determine a precedence value used to mark the packet based on the determined number of tokens; and
an upgrade engine, communicatively coupled to the marker engine, configured to upgrade the determined precedence value to a higher precedence value when a pre-specified number of previously received packets were marked with the same determined precedence value, wherein
the marking engine is configured to mark the packet for a particular forwarding treatment using at least one token bucket.

* * * * *